US012580911B2

(12) United States Patent
Singh et al.

(10) Patent No.: US 12,580,911 B2
(45) Date of Patent: Mar. 17, 2026

(54) SYSTEMS AND METHODS FOR USE IN SECURING DIGITAL IDENTITIES FOR USER AUTHENTICATION

(71) Applicant: MASTERCARD INTERNATIONAL INCORPORATED, Purchase, NY (US)

(72) Inventors: Sachin Kumar Singh, Pune (IN); Kaushal Shetty, O'Fallon, MO (US); Mayank Joshi, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 73 days.

(21) Appl. No.: 18/595,299

(22) Filed: Mar. 4, 2024

(65) Prior Publication Data

US 2025/0279999 A1     Sep. 4, 2025

(51) Int. Cl.
*H04L 9/40*          (2022.01)

(52) U.S. Cl.
CPC ...... *H04L 63/0876* (2013.01); *H04L 63/0861* (2013.01)

(58) Field of Classification Search
CPC ........................ H04L 63/0876; H04L 63/0861
USPC .......................................................... 726/6
See application file for complete search history.

(56) References Cited

U.S. PATENT DOCUMENTS

| | | | | | |
|---|---|---|---|---|---|
| 7,979,899 | B2 * | 7/2011 | Guo | ...................... | H04L 63/105 |
| | | | | | 726/20 |
| 8,369,831 | B2 * | 2/2013 | Bennett | ............... | H04W 12/062 |
| | | | | | 455/442 |

| | | | | | |
|---|---|---|---|---|---|
| 8,762,730 | B2 * | 6/2014 | Jibbe | ..................... | H04L 9/3234 |
| | | | | | 713/168 |
| 10,693,650 | B2 * | 6/2020 | Wease | ................... | H04L 9/3242 |
| 10,891,617 | B2 * | 1/2021 | Kohli | .................. | H04L 63/0861 |
| 11,316,842 | B2 * | 4/2022 | Bendersky | ............ | H04L 9/3239 |
| 11,528,143 | B2 * | 12/2022 | Wease | ................. | H04L 63/0861 |
| 11,652,638 | B2 * | 5/2023 | Bhattacharjee | ....... | H04L 9/0894 |
| | | | | | 713/155 |
| 2016/0301689 | A1 * | 10/2016 | Roy | .................... | H04W 12/082 |
| 2017/0085562 | A1 * | 3/2017 | Schultz | ............. | G06V 40/1371 |
| 2018/0145974 | A1 * | 5/2018 | Mardikar | ............. | H04L 9/3228 |

(Continued)

FOREIGN PATENT DOCUMENTS

WO     WO-2024026428 A1 *     2/2024     ............. G06F 21/64

OTHER PUBLICATIONS

Nist, Paul A. Grassi, "Digital Identity Guidelines" Jun. 2017 (NIST Special Publication 800-63B).*

*Primary Examiner* — Samson B Lemma
(74) *Attorney, Agent, or Firm* — Harness, Dickey & Pierce, P.L.C.

(57)          ABSTRACT

Systems and methods are provided for use in provisioning digital identities for users. One example computer-implemented method includes receiving, by a computing device, a request to register a digital identity to the communication device, where the request includes a unique device identifier specific to the communication device and at least one biometric, and determining, by the computing device, whether the unique device identifier is associated with an existing digital identity. The method also includes, in response to determining that the unique device identifier is associated with the existing digital identity, declining, by the computing device, provisioning of a digital identity to the communication device.

14 Claims, 4 Drawing Sheets

(56)          References Cited

U.S. PATENT DOCUMENTS

| | | | | |
|---|---|---|---|---|
| 2018/0165781 A1* | 6/2018 | Rodriguez | ............... | H04L 63/08 |
| 2019/0190718 A1* | 6/2019 | Wease | ................... | H04L 9/3242 |
| 2019/0320039 A1* | 10/2019 | Kamal | ................ | H04L 63/0861 |
| 2020/0007333 A1* | 1/2020 | Young | ........................ | H04L 9/50 |
| 2020/0322157 A1* | 10/2020 | Wease | ................... | H04L 9/3247 |
| 2021/0029100 A1* | 1/2021 | Bendersky | .......... | H04L 63/0876 |
| 2021/0314166 A1* | 10/2021 | Maheshwari | ........... | G06F 17/40 |
| 2021/0377213 A1* | 12/2021 | Hafez | ................ | H04L 63/0209 |
| 2021/0385653 A1* | 12/2021 | Sau | ........................ | H04W 12/04 |

* cited by examiner

SYSTEMS AND METHODS FOR USE IN SECURING DIGITAL IDENTITIES FOR USER AUTHENTICATION

FIELD

The present disclosure generally relates to systems and methods for securing digital identities for user authentication.

BACKGROUND

This section provides background information related to the present disclosure which is not necessarily prior art.

People are known to be associated with a variety of different types of accounts, including email accounts, bank accounts, and payment accounts, to name a few. In connection with opening the accounts, people to be associated with the accounts (broadly, users) may initially need to be identified and verified. For example, when a person opens a banking account with a banking institution, the banking institution typically requires the person to present identification, often in the form of a driver's license or other government issued document, prior to permitting the person to open the account. Such identification process, or "know your customer" (KYC) process, is provided to inhibit the person from fraudulently opening the account, based on, for example, identity theft or otherwise. More broadly, the identification process aids the banking institution in abiding by applicable rules and/or regulations regarding accounts issued thereby (e.g., relating to anti-money laundering, anti-corruption, etc.).

BRIEF DESCRIPTION OF DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Many users utilize associated digital identities as a manner of proving their identities to relying parties. The digital identities are formed through registration of the users, whereby data included in the digital identities is verified as correct, but without validation of the data against other like or unlike digital identities. The lack of such validation provides for exposure in the provisioning of multiple different identities (or synthetic identifies) to devices (e.g., smartphones, etc.), which defines an exposure in data security associated with digital identities.

Uniquely, the systems and methods herein restrict generating digital identities based on unique device identifier(s) associated with computing devices (e.g., smartphones, etc.). In particular, the systems and method herein provide for validating the unique device identifier(s) associated with the computing devices (to which the digital identities is/are to be associated) prior to registering digital identities, alone or in combination with other validations (e.g., biometrics, mobile numbers, government identification numbers, etc.), to ensure the propriety of the requests for the digital identities. In this manner, through the systems and methods herein, more secure and efficient registration of digital identities to users and/or devices is provided, and protected by a multi-factor authentication of the users, and is further protected from multiplication across different identities and/or devices.

Figure 1:
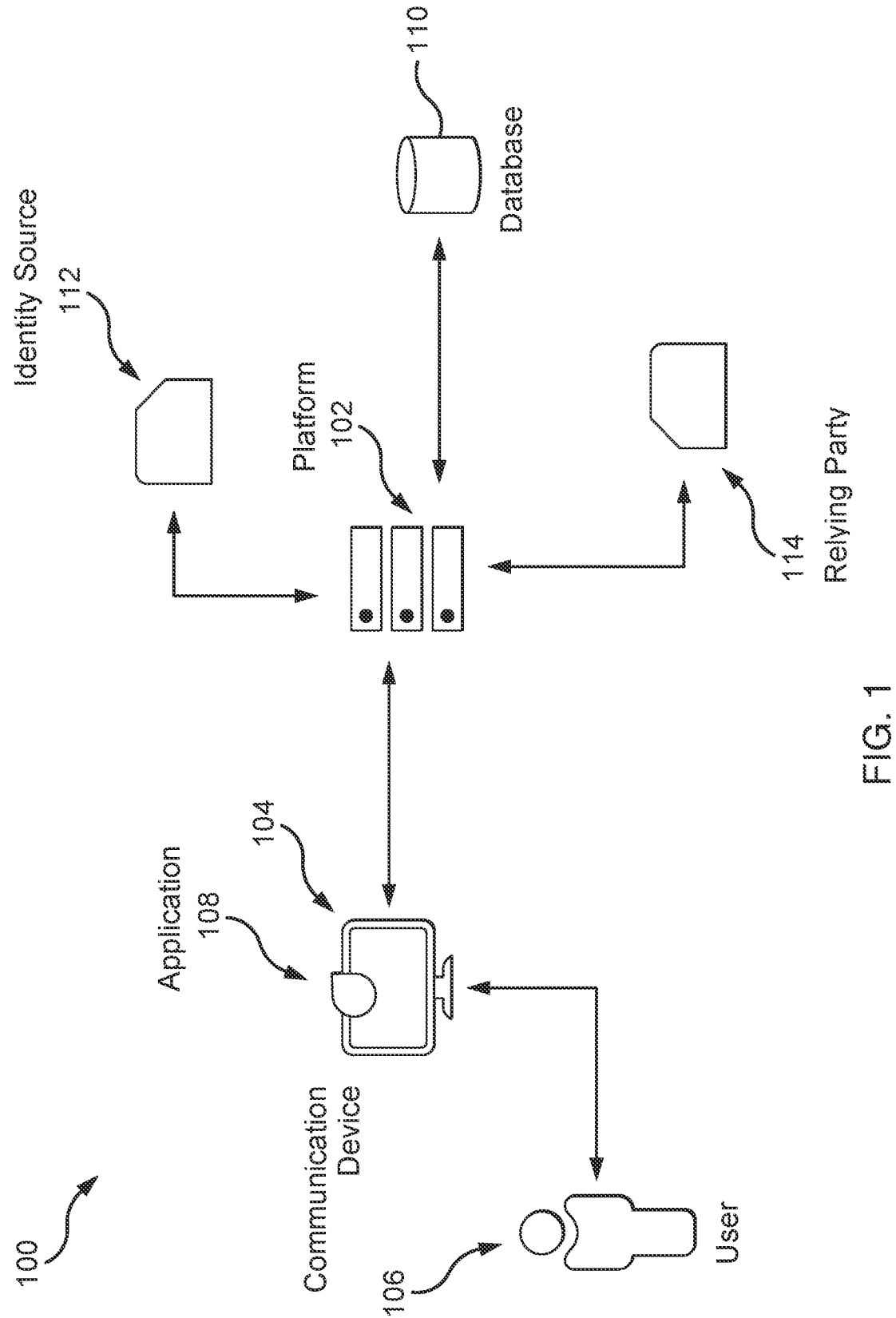
FIG. 1 illustrates an example system of the present disclosure suitable for use in securing digital identities for users, in connection with registration and subsequent use in authenticating the users.

FIG. 1 illustrates an example system 100, in which one or more aspects of the present disclosure may be implemented. Although the system 100 is presented in one arrangement, other embodiments may include the parts of the system 100 (or other parts) arranged otherwise depending on, for example, types of devices, participant(s) in identity verification, privacy regulations and/or requirements, etc.

The system 100 generally includes an identity platform 102 and a communication device 104 associated with a user 106 and including a mobile application 108, each of which is coupled to (and is in communication with) one or more networks. The network(s), as indicated generally by arrowed lines in FIG. 1, may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In various embodiments, the communication device 104 may include, for example, a smartphone, a tablet, a wearable device (e.g., a smart watch, etc.), a personal computer device, a laptop computing device, etc., each of which is generally a portable communication device. In at least one embodiment, the communication device 104 is associated with limited portability.

In the example embodiment of FIG. 1, the platform 102 is configured to interact with the mobile application 108 included in the communication device 104. The platform 102 may be a standalone service and/or entity. Alternately, the platform 102 may be incorporated, in whole or in part, with another entity in the system 100, such as, for example, a payment network, a processing network, or a banking institution, etc. Specifically, for example, the platform 102 may be incorporated into the MASTERCARD payment network.

In general, the platform 102 includes a computing device, an example of which is shown in detail in FIG. 2 (and is described in more detail hereinafter). In addition, the platform 102 is associated with a database 110, which is configured to communicate with the platform 102 (and/or a requestor associated therewith, etc.), either directly or through one or more networks. The database 110 is configured to store digital identities, and attributes, as applications (together or separately). In this example embodiment, the database 110 includes a block chain data structure, whereby the database 110 includes a continually growing list of ordered, immutable records (where each record includes a time stamp and a reference or link to a prior record). That said, it should be understood that other, equivalent or not, data structures may be employed in other embodiments for use in the database 110 and/or for use with the platform 102, etc.

The communication device 104 in the system 100 is associated with the user 106 (e.g., where the communication device 104 is a personal device of the user, not a publicly available and/or shared device, etc.). The user 106, in turn, is associated with an identity. The identity generally indicates and/or includes (without limitation) one or more of a name, a physical address, a birthdate, contract information (e.g., phone number, email address, etc.), a social security number or other government identification number for the user 106, biometrics of the user 106 (e.g., a facial image, a fingerprint, a palm print, a heartbeat, a retina scan, etc.), etc. The user's identity may be evidenced by a number of physical documents and/or devices, all of which may be used alone, or in combination, as described herein. For example, such physical documents may include a passport, a driver's license issued by a state, regional, or federal government (or other government issued ID); a government identification card, a social security card; a health insurance card; a bank statement; an employee ID; a library card; a utility bill; etc.

Further, the identity may include data specific to the communication device 104, which may be a unique device identifier, such as, without limitation, an electronic serial number (ESN), a MAC address, a SIM ID, an IMEI (International Mobile Equipment Identity) number, a mobile phone number, a serial number, a device ID, etc. It should be appreciated herein that the unique identifier forms part of the identity of the user 106 based on the specific, singular association of the user 106 with the communication device 104.

Further in the illustrated system 100, the mobile application 108 may be integrated in or included as part of one or more additional applications downloaded to, installed, and/ or active in the communication device 104. The additional applications may provide other functionality to the communication device 104. In this way, the application 108 may include a software development kit (SDK) made available from the platform 102. In addition, the mobile application 108 is associated with the platform 102, in that the platform 102 has developed, disseminated, sponsored, certified, and/ or signed the mobile application 108. In this way, the mobile application 108 may be provided in a number of manners, including, for example, by download from the platform 102 directly or indirectly, via an affiliate, or intermediate, or application library/service/store, etc.

As shown, the system 100 also includes an identity source 112 and a relying party 114. The identity source 112 includes an entity, business, group, agency, etc., which is a holder of identifying information about users, including the user 106. One example identity source 112 is a government agency, which includes a database of government identification numbers, such as, for example, social security numbers, driver's license numbers, passport numbers, etc. Another example identity source 112 includes a service provider, which is in possession of identifying information based on services provided to the users. One example service provider includes a telecommunication provider, whereby the service provider is in possession of mobile numbers for users thereof. Other example identity sources 112 include, without limitation, banks, financial institutions, medical providers, educational institutions, credit reporting agencies, identity providers, etc.

In this example embodiment, the identity source 112 is configured to store identifying information about the users and to expose an application programming interface (API) which may be accessed to verify one or more aspects of the identifying information (subject to the proper consent or permission (e.g., including from the users, etc.)).

The relying party 114 is configured to provide, for example, services, products, etc., to users, for which the relying party 114 relies on identities of the users to provide access, permission, etc., to the services, products, etc., and/or to provide for payment from the users for the same. The relying party 114 may include, for example, an entity, at which the user 106 is attempting to purchase a product or a service (e.g., ongoing services, recurring product delivery, etc.) For purposes of the description herein, the user 106 generally interacts with the relying party 114 through the communication device 104, as described in more detail below.

It should be appreciated that, while there is only one identity source 112 and one relying party 114 in this example, for purposes of illustration, other system embodiments generally include multiple identity sources 112 and/or relying parties 114, which are each consistent with the descriptions herein.

Figure 2:
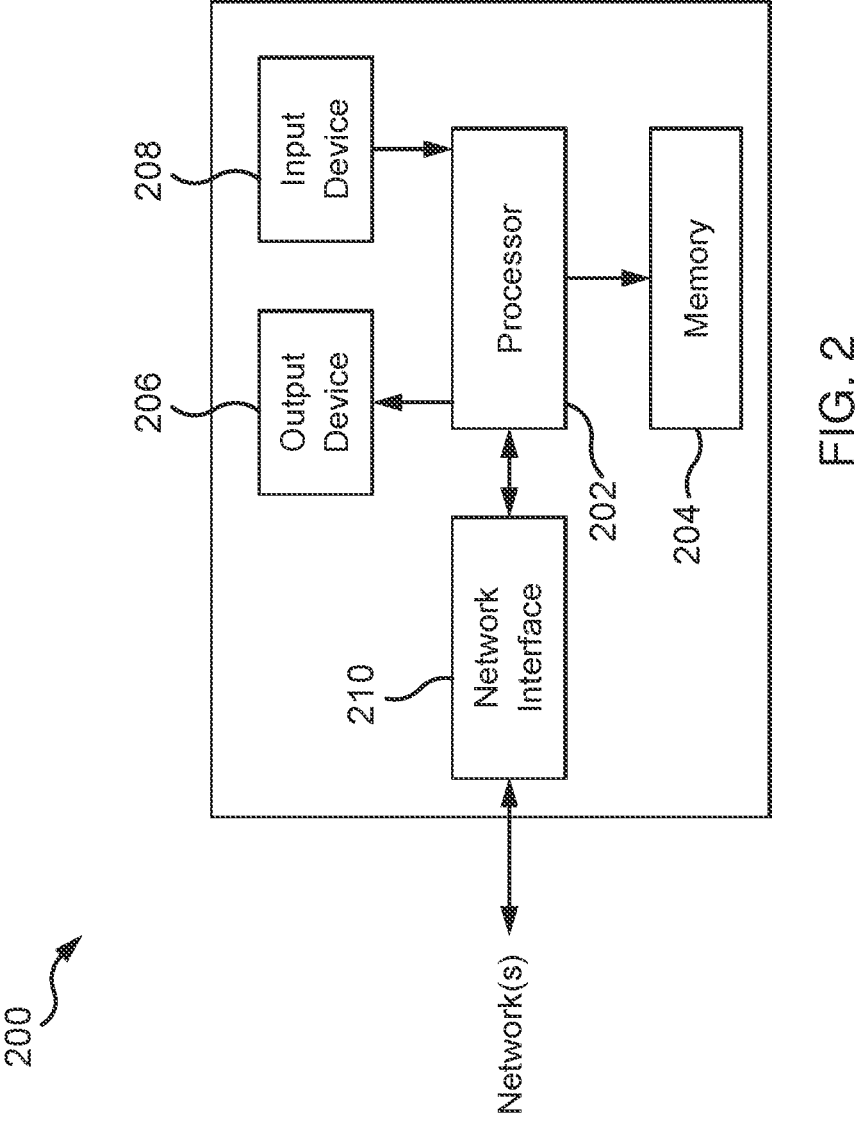
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, and as described above, the platform 102 may include or be implemented in, one or more of the computing device 200, coupled to (and in communication with) one or more networks. In addition, the communication device 104 and the database 110 should also be considered computing devices (or as including computing devices) generally consistent with computing device 200 for purposes of the description herein. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, biometrics (e.g., facial images, fingerprints, etc.), unique device identifiers, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the operations or processes described herein.

In the example embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information (e.g., prompts to provide biometrics, indication of successful provisioning of a digital identity, etc.), visually or audibly, for example, to a user of the computing device 200 (e.g., a user associated with the communication device 104, etc.), etc. And, various interfaces (e.g., as defined by the mobile application 108, or as defined by one or more websites, etc.) (e.g., including instructions to capture biometrics, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

In addition, the computing device 200 includes an input device 208 that receives inputs from the user (i.e., user inputs) of the computing device 200 such as, for example, images of physical documents, images of the user (e.g., facial images, etc.), and/or biometrics for the user, etc., in response to prompts from the mobile application 108, as further described below. The input device 208 may include a single input device or multiple input devices. The input device 208 is coupled to (and in communication with) the processor 202 and may include, for example, one or more of a keyboard, a pointing device, a mouse, a camera, a biometric reader (e.g., fingerprint scanner, etc.), a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a radio-frequency (RF) adapter, a Bluetooth™ adapter, etc.), a mobile network adapter, or other device capable of communicating to one or more different ones of the networks herein and/or with other devices described herein.

Referring again to FIG. 1, when the user 106 decides to register to create a digital identity, the user 106 downloads or otherwise includes the mobile application 108 into the communication device 104 (e.g., by downloading the mobile application 108 directly, or by downloading an application of which the mobile application 108 is a part, etc.). The user 106 then accesses or launches the mobile application 108, whereby the communication device 104 is configured consistent with the description herein.

In particular, initially, for example, the communication device 104 is configured, by the mobile application 108, to generate a private-public key pair, which includes a private key and a public key. The private-public keys are used in the registration of the digital identity of the user 106, and the keys are linked to, or tied to, the user's digital identity. The communication device 104 is initially configured, by the mobile application 108, to store the private key in memory (e.g., a secure element or local memory of the communication device 104, etc.) and also to share the public key with the platform 102.

Then, in response to an input from the user 106 to register his/her digital identity, the communication device 104 is configured, by the mobile application 108, to solicit and/or collect certain data related to the communication device 104 and the user 106. In this example embodiment, the communication device 104 is configured, by the mobile application 108, to collect the mobile number of the communication device 104 (in examples where the communication device 104 is a smartphone) and one or more unique device identifiers specific to the communication device 104, such as, for example, an ESN, IMEI number, SIM ID, MAC address, or other suitable identifier, alone or in combination, etc.

Additionally, the communication device 104 is configured, by the mobile application 108, to capture one or multiple biometrics of the user 106, via one or more input devices of the communication device 104 (e.g., a biometric reader, a camera, etc.). In this example embodiment, the biometric includes two biometrics: a fingerprint (e.g., index print, thumb print, etc.) of the user 106 and a facial image of the user 106. It should be appreciated that only one biometric may be captured as part of registration in other system embodiments, and that different biometric(s) may be captured in still other system embodiments. It should be further appreciated that the communication device 104 is configured, by the mobile application 108, to process the raw biometric into a digital impression based on one or more techniques or protocols included in the mobile application 108, or otherwise in the communication device 104. The digital impression may include, simply, a data representation of the biometric(s), or may include an encoded, encrypted and/or compressed data representation of the biometric(s), which are, regardless, unique to the specific biometric(s). The digital impression processing is defined to and/or known by the platform 102, whereby digital impressions may be interpreted correctly (e.g., based on a type of fingerprint scanner, or a technique/protocol for encoding or encrypting a facial image, etc.).

It should be appreciated that the digital impression relies on the private key of the communication device 104, as generated above. In this manner, in this exemplary embodiment, the communication device 104 is configured, by the mobile application 108, to encrypt or hash the digital impression of the biometrics based on the private key stored in the communication device 104 (and associated with the mobile application 108).

Also, the communication device 104 is configured, by the mobile application 108, to solicit and/or capture one or more government identification numbers, which may be issued by federal, state or local governments (e.g., departments, agencies, regulators, etc.). The government identification number(s) may include, without limitation, a social security number, driver's license number, passport number, etc. In one example, the user 106 may, in turn, key in or otherwise enter the government identification number (e.g., via a keypad or touchscreen, etc.), whereby the number itself constitutes the government identification number. In another example, the user 106 captures, via the communication device 104 (e.g., via a camera input device, etc.), an image of a document containing the government identification number, whereby the image constitutes the government identification number, or alternatively, the government identification number is extracted therefrom.

In one or more embodiments, the government identification number may instead be a non-government identification number, such as issued by a private business (e.g., employer of the user 106 (e.g., employer identifier, etc.), etc.), group, association, etc.

Further still, the communication device 104 is configured, by the mobile application 108, to solicit personal identifying information for the user 106, which is different than or in addition to the data described above. The information may include a name, a physical address, a birthdate, contact information (e.g., phone number, email address, etc.), height, weight, eye color, birth place, birth country, gender, account numbers (e.g., bank account numbers, credit card account numbers, debit card account numbers, savings account numbers, etc.), other identification numbers (e.g., patient ID, employee numbers, etc.), etc. In response, the user 106 inputs the data, and the communication device 104 is configured, by the application 108, to collect the input data. Again, as above, the data may be input manually by the user 106, or included in a captured image of one or more documents, etc.

It should be appreciated that other data may be collected by the communication device 104, as configured by the mobile application 108, where the data is related to and/or included in the identity of the user 106, or otherwise, unique (at some level) to the user 106.

Once the data is collected, the communication device 104 is configured, by the mobile application 108, to encrypt the data representative of the multiple attributes and to store the encrypted data in memory of the communication device 104. The communication device 104 is configured, by the mobile application 108, to also provide (e.g., push, etc.) (e.g., via an application programming interface (API), etc.) the data representative of multiple attributes of the user's identity to the platform 102. The data includes, among other things, the personal identifying information (or attributes of the user's identity), the unique device identifier(s), the biometric digital impression(s), the mobile number (if applicable), the government identification number (e.g., the number or image, etc.), other collected data, etc. It should be understood that, in this exemplary embodiment, the data is hashed by the communication device 104, using the private key generated above (or based on other techniques), prior to providing the same to the platform 102. In connection therewith, the platform 102 is configured to receive and store the hashed data in association with the public key that is received from the communication device 104.

The platform 102, in turn, is configured to initiate a validation process for the user 106 and the communication device 104, based on special logic.

As part thereof, the platform 102 is configured to validate one or more attributes of the asserted identity with one or more identity sources 112.

In particular, for example, the platform 102 may be configured to submit the government identification number to the identity source 112 (e.g., a government agency, etc.), via an API exposed thereby. In turn, the identity source 112 is configured to receives the data, to confirm the data is genuine, and/or to provide and/or verify one or more attributes associated with the government identification number, etc. In this manner, the platform 102 is configured to verify the government identification number and/or that the government identification number as being associated with the correct name, correct physical address, correct biometric, or other correct attributes. In another example, the platform 102 may be configured to submit the mobile number to the identity source 112 (e.g., a network service provider, etc.), via an API exposed thereby. In turn, the identity source 112 is configured to receive the mobile number and other data, to confirm the data is genuine and/or to provide and/or verify the mobile number and/or one or more attributes associated with the mobile number, etc. In this manner, the platform 102 is configured to verify that the mobile number is being associated with the correct name, correct physical address, or other correct attributes.

It should be appreciated that the biometric data and/or the unique device identifier may be verified in a similar manner with the identity source 112 (or other identity source). For example, the unique device identifier may likewise be verified through communication with the network service provider.

Based on the verification of the attributes of the identity of the user 106, if applicable, the platform 102 is configured to validate the registration to the communication device 104. In the validation process, after or prior to verifying the one or more attributes, the platform 102 is configured to determine whether the government identifier, the biometric(s), the mobile number, etc., pushed from the communication device 104, is/are included in the database 110.

As an initial part of the validation process, the platform 102 is configured again to search for the unique device identifier(s) in the database 110. The unique device identifiers may be identified by a search in the database 110.

As a further part of the validation process, the platform 102 may be configured to determine whether the same or similar biometric is present in the database 110. This generally includes a comparison of one or more of the biometrics, which is pushed from the communication device 104 and decrypted based on the public key, to reference biometrics included in the database 110 (which is/are either decrypted as store or decrypted based on an associated public key). In connection therewith, it should be understood that the database 110 includes each prior digital identity registered to the platform 102, where each digital identity includes the unique device identifier and the biometric(s), which are stored in a decoupled manner. In this way, the database 110 permits the platform 102 to be configured to verify each of the unique device identifiers and the biometrics both individually, as above, and then also in conjunction with one another (i.e., pairs of unique device identifiers and biometric).

As a still further part of the validation process, the platform 102 may be configured to determine whether the same public key (as part of the private-public key pair generated by the communication device 104 discussed above) has previously been used and/or received as part of pushed data for registration of the digital identity.

Other parts of the validation process may include identifying other data, such as, a government identification number, mobile number, etc., by a search, by the platform 102, in the database 110. The searching and/or comparison of the validation process as described above may be completed in series, or in parallel, depending, for example, potentially, on the logic applied to permit or decline generation of a digital identity.

Next, the platform 102 is configured to generate a digital identity, based on or in response to the unique device identifier for the communication device 104, the biometric(s), and other data not being included in existing digital identities in the database 110 (i.e., successful validation process).

In doing so, in this example embodiment, the platform 102 is configured to generate a hash of the data, to store the data as part of the digital identity (e.g., name, physical address, government identifier, contact info, biometrics, gender, height, weight, account numbers, etc.), and to encrypt the unique device identifier and the biometric(s) into a token (e.g., an abc.mcid token, etc.). In addition, the platform 102 may be configured to delete the data after hashing the same (e.g., such that the underlying data is not maintained, stored, etc. at the platform 102; etc.). Also, the hashing may include a one-way hashing, whereby the data is not generally recoverable after being hashed. It should be appreciated that, alternatively, the communication device 104 may be configured to hash the data of the digital identity and to provide the same to the platform 102, whereby the platform 102 is configured to store the same (e.g., such that the platform 102 does not receive the underlying data, such that the underlying data is not provided to the platform 102, etc.). In either instance, the platform 102 has validated the data and also includes the hashed data, for subsequent purposes or later operations, but does not include the "clear" data or un-hashed data of the digital identity.

Further, in connection therewith, the token may be generated as desired, for example, using one or more natural language processing (NLP) models such as transformers (e.g., Bidirectional Encoder Representations from Transformers (BERT), etc.), Byte Pair encoding, or modes from the Hugging face transformer library, etc. The content of the token may be hashed, to thereby include hashed details of the user 106 (e.g., hashed thumb biometric details, hashed face biometric details, a hashed government identification number, a hashed mobile number, hashed identifiers relating to the communication device 104 (e.g., MAC ID, Device ID, Device Serial Number, etc.), etc.). Asymmetric encryption may be used to encrypt the token (e.g., using suitable encryption functions such as a secure hash algorithm (SHA) (e.g., SHA-256, etc.), etc.).

In this example embodiment, the platform 102 is configured to then push the generated token back to the communication device 104.

The communication device 104 is configured, in turn, by the mobile application 108, to store the token in memory thereof, such as, for example, a secured element (SE) of the communication device 104. The example SE may include a restricted access chip, on which no programs can be installed (its programming is preinstalled during production). What's more, the application 108 may have read/write access to the token, while only partnered, trusted applications have write access thereto. In this way, the digital identity is tied to the communication device 104, which is then required to retrieve the digital identity.

In another example, the platform 102 is configured to generate a digital identity, based on or in response to the unique device identifier for the communication device 104 not being included in existing digital identities in the database 110 but with other data to be matching data in the database 110 in the validation process. In such an example, the database 110 includes an existing digital identity for the user 106, which is associated with a different communication device, whereby the unique device identifier is unique to that device but not included in the database 110. Thus, the platform 102 is configured to search for the unique device identifier of the communication device 104, but not find it (i.e., because it is new). However, the platform 102 is configured to also search for the biometric(s), whereby the biometric(s) are identified as a match for the existing digital identity (e.g., based on comparison, via the public key from the communication device 104; etc.). The platform 102 may be further configured to then match the hashed government identification number, the mobile number, and/or other data to the existing digital identity.

In response to matching data, the platform 102 is configured to generate the digital identity, and in doing so, to hash the data, to store the hashed data as part of the digital identity and to encrypt the unique device identifier and the biometric(s) into an abc.mcid token, for example, as generally described above. In this way, the platform 102 is able to generate more than one digital identity for the user 106, but only one digital identity per device (i.e., the communication device 104 versus other devices). The platform 102 is configured to then push the abc.mcid token back to the communication device 104. The communication device 104 is configured, in turn, by the application 108, to store the abc.mcid token in memory thereof, such as, for example, in a secured element (SE) of the communication device 104. In this way, again, the digital identity is tied to the communication device 104, which is then required to retrieve the digital identity.

In response to non-matching data, the platform 102 is configured to decline validation and to not generate the digital identity. The platform 102 may be further configured to issue a warning and/or a notification.

In yet another example, the platform 102 is configured to decline validation and to not generate the digital identity, based on or in response to the unique device identifier (from the communication device 104) being the same as a unique device identifier included in the database 110. In this way, the communication device 104 is only permitted to have one digital identity in the database 110, as defined by the unique device identifier (e.g., the SIM ID, ESN, MAC Address, or combinations thereof, etc.). In connection therewith, the database 110 may be configured to retain each and every unique device identifier, whether the associated digital identity is active in the database 110 or not, to ensure only one digital identity is generated for the life of the communication device. Additionally, or alternatively, it should be appreciated that one or more verified manners of "scrubbing" the unique device identifier may be provided in various embodiments.

In a still further example, the platform 102 is configured to decline to generate the digital identity in response to one or more of the biometrics (from the communication device 104) being the same as a biometric included in the database 110, alone, or when associated with a different government identifier.

It should be appreciated that the platform 102 may employ one or more different combinations of unique device identifiers, biometrics and other data to ensure, for a particular security level, that a digital identity for a user 106 is limited to one or more communication devices, or is consistent across the multiple communication devices.

It should be further appreciated that the validation may be retained, in whole or in part on the communication device

104, whereby the communication device 104 is configured, by the application 108, to interact with the database 110 (directly or through the platform 102) and to perform some or all of the above. In the end, as above, the communication device 104 is configured, by the application 108, to store the token (if generated based on the specific logic) in the memory thereof.

It should be understood that the mobile application 108 in the communication device 104, or in another communication device, configures the device to not be allowed to generate more than one private key for one digital identity. This is irrespective of the number of communication devices. As such, in connection with the user 106 switching from one communication device (e.g., the communication device 104, etc.) to a new communication device, the user 106 again downloads the mobile application to the new communication device. The new communication device is configured, by the mobile application 108, to prompt the user 106 to either signup or sign in. The user 106 is already associated with a digital identity, as described above, so the user 106 will select to sign in.

In turn, the new communication device is configured, by the mobile application 108, to update the device prolife for the digital identity in the platform 102 (e.g., whereby the new unique device identifier(s) are stored, as above, etc.).

That is, if all of the previous submitted data is the same but the communication device is new, then the mobile application 108 configures the communication device 104 to confirm with the user that the new communication device is the new primary device. Upon confirmation, the communication device 104 is configured, by the mobile application 108, to fetch new mobile hardware/system data to generate a new private-public key pair. The communication device 104 is configured, by the mobile application 108, to flush the preexisting private key from the communication device 104, and the platform 102 is configured to delete the public key. And, the communication device 104 is configured, by the mobile application 108, to push the new private key to the new communication device (and specifically, a secure element thereof), as the communication device 104 has permissions granted by the user 106 to do so.

In a situation in which the user 106 is associated with multiple communication devices, at one time, the user 106 proceeds as above, but when the digital identity is identified (e.g., by the unique device identifier(s), etc.), the sign-in request is directed to the communication device 104, which is the primary communication device. The user 106 is permitted to sign in on the other communication device into the digital identity (for use as described below in presenting the digital identity) through the communication device 104, as configured by the mobile application 108.

Subsequently, in connection with using the digital identity, when generated, the user 106 is then able to initiate a transaction, with a relying party 114, via the communication device 104. As part thereof, the communication device 104 is configured to provide the unique device identifier(s) to the relying party 114 (or the relying party 114 is configured to retrieve the unique device identifier(s)).

The relying party 114 is configured to compile an authorization request for the transaction, which includes the unique device identifier(s) and also the details of the transaction, such as, for example, the name of the user 106, an account number of a payment account, the physical address of the user 106, etc. The relying party 114 is configured to transmit the authorization request to an issuer of the payment account, through a processing network, which includes the platform 102. The platform 102 is configured, in response to the authorization request, to search for the unique device identifier(s) in the database 110 (e.g., in hashed or un-hashed form, etc.). When the unique device identifier(s) is found, the platform 102 is configured to validate data included in the authorization request against the digital identity associated with the unique device identifier(s) (either include in the database 110 or at the communication device 104, via the unique device identifier(s)). That is, the platform 102 identifies the data of the digital identity from the authorization request and hashes the same (consistent with the techniques above) and then matches the hashed data to the hashed data stored by the platform 102. When the data matches, the data is validated.

It should be appreciated that in at least one embodiment, the hashing and comparing may be performed in the communication device 104, whereby the platform 104 provides the data included in the authorization request to the communication device 104, the communication device 104 hashes and compares the data, prior to providing a validation, or not, back to the platform 102.

Depending on whether data is validated, the platform 102 is configured to permit the transaction to proceed to the issuer. The authorization request may only be forwarded when the data is validated, whereby the transaction is declined automatically when the data is not validated. Alternatively, the platform 102 may be configured to append a flag to the authorization request to indicate the data is validated, or that the data is not validated. The issuer is then permitted to approve, or not, the transaction based on the flag.

Figure 3:
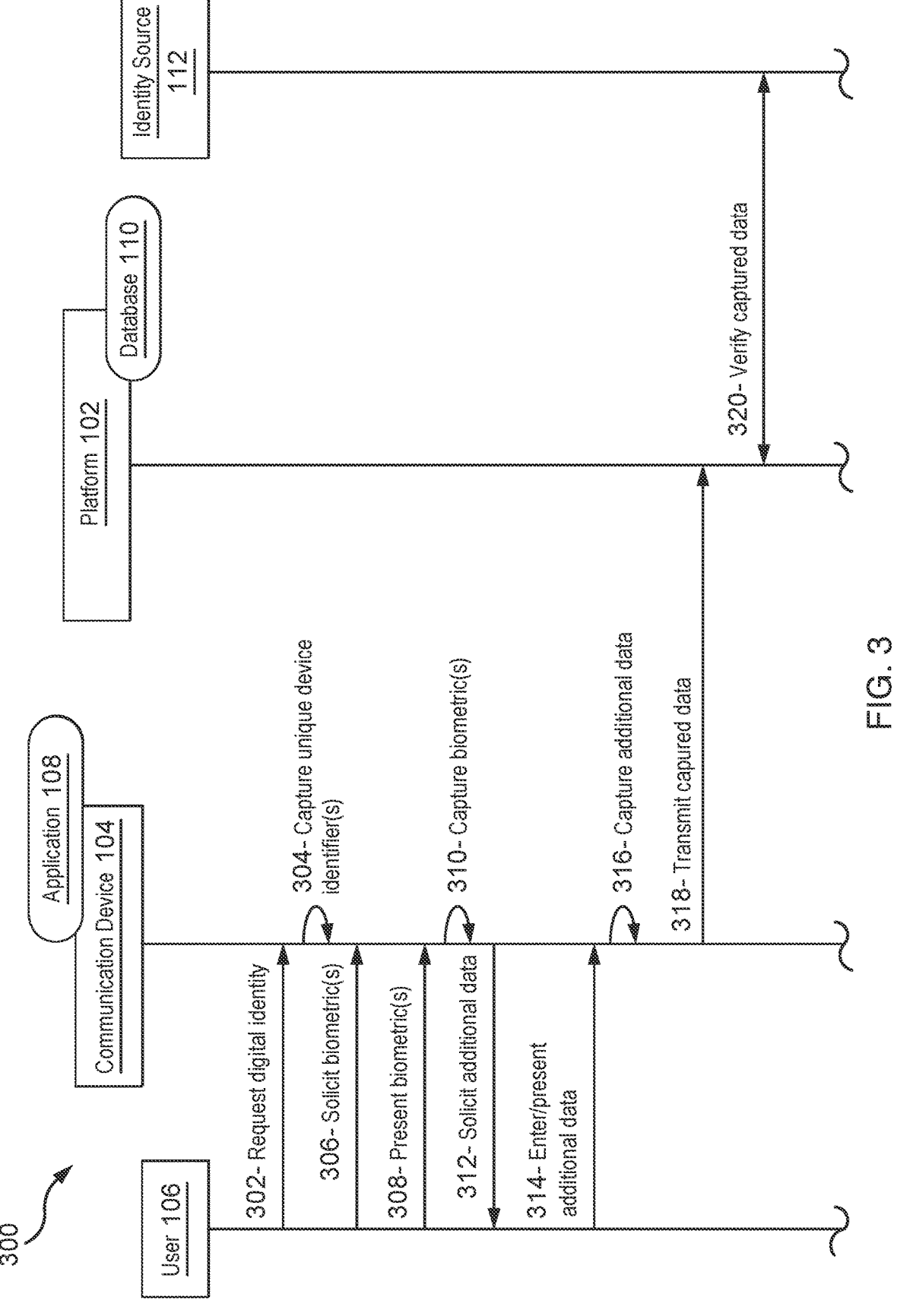
FIG. 3 includes a flow diagram of an example method, which may be implemented in connection with the system of FIG. 1 for securing digital identities for user authentication.
Figure 3:
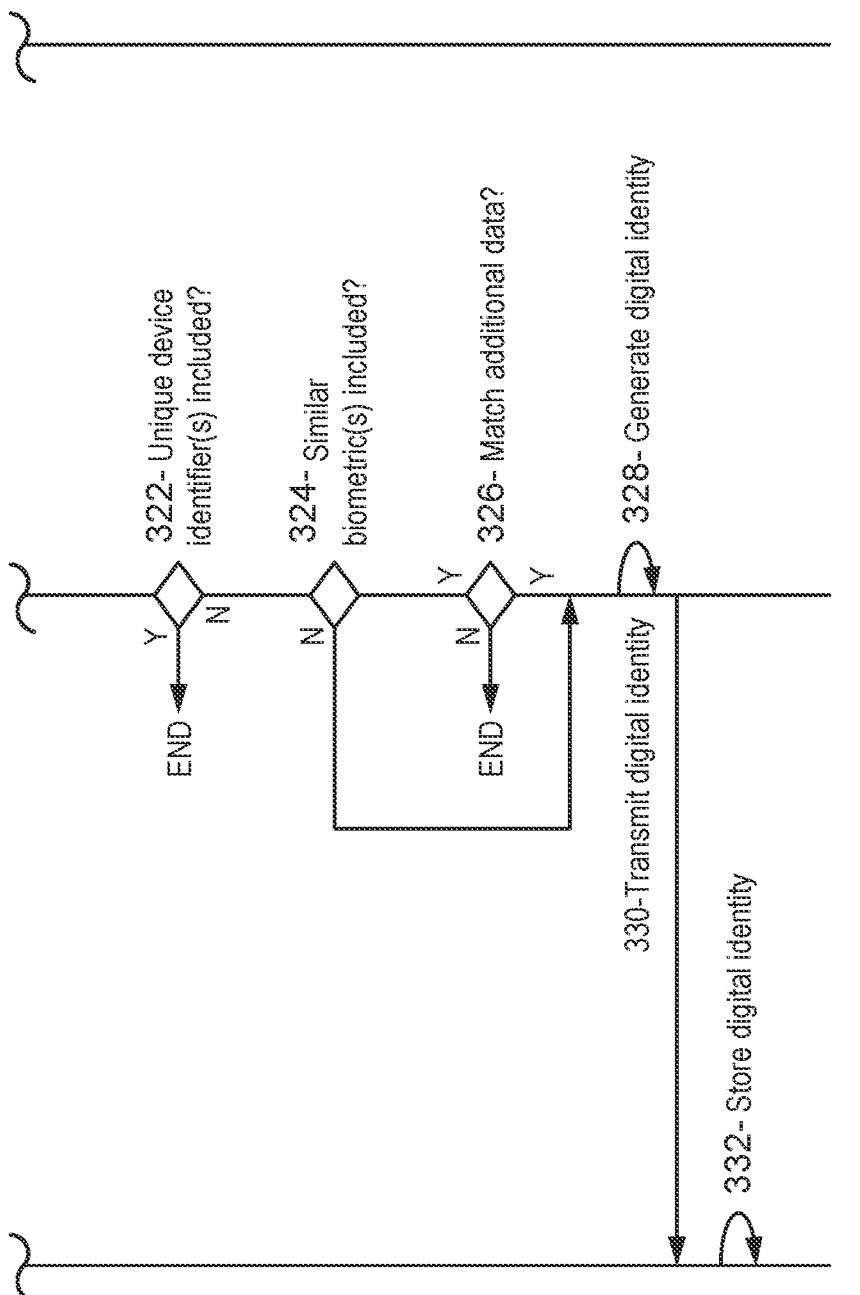

FIG. 3 illustrates an example method 300 for use in registering a digital identity. The example method 300 is described as implemented in the platform 102, the communication device 104, etc., of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

In the method 300, the user 106 desires to provision a digital identity to the communication device 104. To do so, the user downloads and installs the mobile application 108 to the communication device 104. Then, to initiate the example method 300, the user 106 launches the mobile application 108 and request, at 302, to provision a digital identity to the communication device 104.

In response, the communication device 104 generates a public and private key pair. The communication device then stores the private key in memory (e.g., a secure element or local memory of the communication device 104, etc.), and transmits the public key to the platform 102 (e.g., between operations 302 and 304 in the method 300, as part of operation 318 in the method 300, etc.). In turn, the platform 102 may store the public key in a secure cloud environment, etc. As described, the private-public keys are used in the registration of the digital identity of the user 106, and the keys are linked to, or tied to, the user's digital identity.

Next, the communication device 104 captures data related to the communication device 104 and the user 106. Specifically, at 304, the communication device 104 captures one or more unique device identifiers of the communication device 104. As above the unique device identifiers may include an ESM, SIM ID, MAC address, IMEI ID, serial number, etc.

Additionally, at 306, the communication device 104 solicits one or more biometrics from the user 106, where the biometric(s) may include, for example, a facial image, a fingerprint, etc. In response, the user 106 presents, at 308, the biometric(s) to the communication device 104 and, at 310, the communication device 104 captures the presented biometric(s). In one example, a camera input device of the communication device 104 captures a facial image of the user 106. In another example, a biometric reader input device of the communication device 104 captures a fingerprint of the user 106. It should be appreciated that other biometrics may be captured by other suitable input devices of the communication device 104.

At 312, the communication device 104 solicits additional data from the user 106. In response the user presents and/or enters the data, at 314. In turn, the communication device 104 captures the data.

In one example the additional data may include a mobile phone number of the communication device 104. In this example, the user 106 may enter the mobile phone number, which is captured by the communication device 104, or the communication device 104 may capture the mobile phone number from memory thereof. In another example, the additional data may include a government identification number, alone or as part of a government document. In this example, the user 106 may enter the government identification number, which is captured by the communication device 104, or the communication device 104 may capture the government identification number as part of an image of the government document. The government identification number may then be either the number itself or the image of the government document.

After the communication device 104 captures the data related to the communication device 104 and the user 106, the data is submitted for validation. The validation may occur in the communication device 104, or in the platform 102. In this example embodiment, the validation is described with reference to the platform 102. That said the steps performed by the platform 102 may be performed by the communication device 104 in other embodiments.

As illustrated, the communication device 104 transmits, at 318, the unique device identifier(s), the biometric(s), and the additional data to the platform 102.

In response, the platform 102 validates, at 320, at least a portion of the data from the communication device 104 with the identity source 112. Validation may include determining, via the identity source 112, that the data is genuine and/or that at least a portion of the captured data is consistent (e.g., part of the same identity, etc.)

In connection therewith, the platform 102 determines, at 322, whether the unique device identifier(s) is/are included in any digital identity in the database 110. As indicated above, the database 110 includes unique device identifiers for previously generated digital identities whereby the digital identities are provisioned to devices associated with the unique device identifiers. That is, the platform 102 determines if there is an existing digital identity for the communication device 104.

When the unique device identifier(s) is/are included in the database 110, the platform 102 ends the method 300, whereby no digital identity is generated. When the unique device identifier(s) is/are not included in the database 110, the platform 102 determines, at 326, whether the biometric(s) are similar to any biometrics included in the database 110.

Thereafter, when the biometric(s) of the request is/are similar to biometrics in the database 110, the platform 102 matches the digital identity associated with the similar biometrics in the database to the additional data included in the request. For example, the platform 102 compares the government identification number in the digital identity in the database 110 to the government identification number included in the request. In this manner, the platform 102 ensures consistency among digital identities having consistent biometrics. It should be appreciated that the additional data may include any data received from the communication device 104, such as, for example, the mobile phone number, name of the user 106, physical address of the user 106, etc.

When the additional data does not match, the platform ends the method 300, whereby no digital identity is generated.

Conversely, as shown when there is no similar biometrics at step 324, or there is a match at step 326, the platform 102 generates, at 328, a digital identity for the user 106. In doing so the platform 102 compiles the unique device identifier(s), the biometric(s), the government identification number(s), and/or the mobile phone number into a token unique to the user 106 and the communication device 104.

The token is shared with the communication device 104, at 330, and the communication of device 104 stores, at 332, the token and the secure element of the communication device 104. The token may then be used in combination with the communication device 104 to authenticate the user 106 in connection with a variety of interactions involving the communication device 104.

In view of the above, the systems and methods herein provide for data security in generating digital identities to restrict duplicative and/or inconsistent usage of identity attributes, especially, unique device identifiers, in generating the digital identities.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the operations recited in the claims, including: (a) receiving a request to register a digital identity to the communication device, the request including a unique device identifier specific to the communication device and at least one biometric; (b) determining whether the unique device identifier is associated with an existing digital identity; and/or (c) in response to determining that the unique device identifier is associated with the existing digital identity, declining provisioning of a digital identity to the communication device.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in provisioning a digital identity for a user to a communication device, the system comprising:
    a database including multiple existing digital identities; and a computing device, which is configured by executable instructions, to:
        receive a request to register a digital identity to the communication device, the request including a unique device identifier specific to the communication device and at least one biometric;
        search for the unique device identifier in the database;
        in response to the unique device identifier being included in the database in one of the multiple existing digital identities, decline to provision a digital identity to the communication device; and
        in response to the unique device identifier not being included in the database in one of the multiple existing digital identities:
            determine whether the at least one biometric is included in the database; and
            in response to the at least one biometric not being in the database, generate a digital identity for the communication device based on the request to register the digital identity.

2. The system of claim 1, wherein the unique device identifier includes an electronic serial number (ESN) and/or a MAC address.

3. The system of claim 1, wherein the request includes additional data; and
    wherein the computing device is further configured, by the executable instructions, to:
        in response to the unique device identifier not being included in the database in one of the multiple existing digital identities, determine whether the at least one biometric is included in the database; and
        in response to the at least one biometric being in the database in one of the multiple digital identities, determine whether the additional data matches data included in the one of the multiple existing digital identities in the database; and
        in response to the additional data matching the data included in the one of the multiple existing digital identities in the database, generate a digital identity for the communication device based on the request to register the digital identity.

4. The system of claim 3, wherein the additional data includes a government identification number, a mobile number, and a name.

5. The system of claim 3, wherein the computing device is configured, by the executable instructions, in determining whether the additional data matches data included in the one of the multiple existing digital identities in the database, to:
    hash the additional data; and
    compare the hashed data to the data included in the one of the multiple existing digital identities in the database.

6. The system of claim 3, wherein the additional data includes a public key generated by the communication device.

7. The system of claim 3, wherein the computing device is further configured, by the executable instructions, to, in response to the additional data not matching the data included in the one of the multiple existing digital identities in the database, decline to provision a digital identity to the communication device.

8. A non-transitory computer-readable storage medium comprising executable instructions, which when executed by at least one processor in connection with provisioning a digital identity for a user to a communication device, cause the at least one processor to:

receive a request to register a digital identity to the communication device, the request including a unique device identifier specific to the communication device and at least one biometric;

search for the unique device identifier in a database having multiple existing digital identities; and in response to the unique device identifier being included in the database in one of the multiple existing digital identities, decline to provision a digital identity to the communication device;

in response to the unique device identifier not being included in the database in one of the multiple existing digital identities:

determine whether the at least one biometric is included in the database; and in response to the at least one biometric not being in the database, generate a digital identity for the communication device based on the request to register the digital identity.

9. The non-transitory computer-readable storage medium of claim 8, wherein the unique device identifier includes an electronic serial number (ESN) and/or a MAC address.

10. The non-transitory computer-readable storage medium of claim 8, wherein the request includes additional data; and wherein the executable instructions, when executed by the at least one processor, further cause the at least one processor to:

in response to the unique device identifier not being included in the database in one of the multiple existing digital identities, determine whether the at least one biometric is included in the database; and in response to the at least one biometric being in the database in one of the multiple existing digital identities, determine whether the additional data matches data included in the one of the multiple existing digital identities in the database; and in response to the additional data matching the data included in the one of the multiple existing digital identities in the database, generate a digital identity for the communication device based on the request to register the digital identity.

11. The non-transitory computer-readable storage medium of claim 10, wherein the additional data includes a government identification number, a mobile number, and a name.

12. The non-transitory computer-readable storage medium of claim 10, wherein the executable instructions, when executed by the at least one processor to determine whether the additional data matches data included in the one of the multiple existing digital identities in the database, cause the at least one processor to:

hash the additional data; and compare the hashed data to the data included in the one of the multiple existing digital identities in the database.

13. The non-transitory computer-readable storage medium of claim 10, wherein the additional data includes a public key generated by the communication device.

14. The non-transitory computer-readable storage medium of claim 10, wherein the executable instructions, when executed by the at least one processor, in response to the additional data not matching the data included in the one of the multiple existing digital identities in the database, to decline to provision a digital identity to the communication device.

* * * * *